(12) United States Patent
Hugentobler (10) Patent No.: US 11,833,897 B2
(45) Date of Patent: Dec. 5, 2023

(54) FUEL ADDITIVE DISPENSING SYSTEM

(71) Applicant: Mark Hugentobler, Ephraim, UT (US)

(72) Inventor: Mark Hugentobler, Ephraim, UT (US)

( * ) Notice: Subject to any disclaimer, the term of this patent is extended or adjusted under 35 U.S.C. 154(b) by 378 days.

(21) Appl. No.: 17/249,145

(22) Filed: Feb. 22, 2021

(65) Prior Publication Data
US 2022/0266683 A1 Aug. 25, 2022

(51) Int. Cl.
*B60K 15/04* (2006.01)
*B60K 15/03* (2006.01)

(52) U.S. Cl.
CPC .... *B60K 15/04* (2013.01); *B60K 2015/03256* (2013.01); *B60K 2015/0458* (2013.01)

(58) Field of Classification Search
CPC .......... B60K 15/04; B60K 2015/03256; B60K 2015/0458
USPC ........................................................ 280/834
See application file for complete search history.

(56) References Cited

U.S. PATENT DOCUMENTS

| | | | |
|---|---|---|---|
| 2005/0217751 A1* | 10/2005 | Valentine | F02M 37/0076 141/104 |
| 2013/0014853 A1* | 1/2013 | Hunt | B60K 15/04 141/1 |

FOREIGN PATENT DOCUMENTS

CA 2270093 A1 * 10/2000 ............. F02M 25/00

* cited by examiner

*Primary Examiner* — Mahmoud Gimie
(74) *Attorney, Agent, or Firm* — Messner Reeves LLP (57) ABSTRACT

A system for dispensing an additive into a fuel is disclosed. The system includes: a tank for holding a fuel additive and a dispenser. The dispenser includes: a main shutoff valve; a bore through which the fuel passes; a float bowl, contained within the walls of the device surrounding the bore; an obstruction located inside the bore of the dispensing device; a seal to prevent the flow of air around the outside of the fuel nozzle pump. The additive tank is connected to the dispenser by a conduit. Gravity causes the additive to flow from the tank, through the conduit into the dispensing device. The main shutoff valve is activated as a device cap is installed and deactivated as the cap is removed. The obstruction causes the additive to be drawn into the flow of fuel within dispensing device.

12 Claims, 6 Drawing Sheets

FUEL ADDITIVE DISPENSING SYSTEM

TECHNICAL FIELD

The present invention relates to fuel additives and automated systems for mixing fuel additives into fuel.

BACKGROUND

As the world moves to more eco-friendly products, and constantly works towards consuming less carbon-based fuel and reducing greenhouse gasses, the efforts to improve fuel economy in vehicles, especially over the road trucks is on the rise. Fuel conserving devices such as skirts and tails that are attached to tractor-trailers have become commonplace. Likewise, certain fuel additives have been proven to create the same positive effects regarding fuel consumption. Fuel catalysts and burn rate modifiers in particular enhance fuel economy. Fuel additives can also provide lubricity, fuel system cleaning and other benefits to engines, enhancing performance, reducing maintenance, service, and upkeep costs.

However, the trucking industry; specifically, owners of trucking companies, have found that applying fuel additives through driver application, is very unreliable. Many see the value of additives but without a reliable, accurate system to administer the product, they cannot use them.

Many attempts have been made to develop a dispensing device that would accurately mix additives with fuel as the fuel is dispensed into vehicles, specifically over the road trucks. Some use electrical circuits, exemplified in U.S. Pat. No. 7,743,737, which are complicated, require access to the trucks electrical system, create inherent risks when exposed to combustibles and are expensive to build. There are attempts at dispensing units that use impellors to draw additive exemplified in U.S. Pat. No. 5,992,473. These impellors are expensive to make and are difficult to maintain. They also create a backpressure that creates back flow activating the automatic shutoff function required on all commercial fuel discharge pump nozzles. Other inventions use diaphragms, floats and pressure induction in one form or the other which requires modifying fuel tanks and are invasive and expensive. Several have tried systems that are actuated by fuel flow out of the fuel pump nozzle through a restricted opening (venturi) that creates a pressure difference that draws additive from the reservoir exemplified in U.S. Pat. No. 9,016,330. However, these devises, as prescribed, have inherent problems. For example, the restricted opening, pressure creating, venturi tube creates backflow up and around the fuel pump nozzle that activates the automatic shutoff mechanism in the fuel pump nozzle, shutting off fuel flow prior to proper fuel tank filling, disallowing their use. Though less expensive and less invasive than the electronic version, the impellor version, or the pressure induction versions, they are neither consistent nor practical.

None of these options has successfully accounted for control of the flow of fuel additive from the fuel additive reservoir to the dispensing device due to gravity exemplified in U.S. Pat. No. 7,216,681. Nearly all examples require the reservoir to be installed above the device. Anytime the passageway is open from the reservoir, fuel additive will flow unrestricted and uncontrolled. Accurate metering of fuel additive based on fuel flow/quantity is virtually impossible. U.S. Pat. No. 7,216,681 for example does not account for the time when the fuel nozzle is inserted into the fuel tank neck but the fuel pump is not activated, a time before the nozzle is activated and the time after the nozzle has shut off. As a result, none of these examples has yet to provide a viable, reliable solution to the end user.

SUMMARY

A system for dispensing an additive into a fuel. The system includes: a tank for holding a fuel additive and a dispenser. The dispenser includes: a main shutoff valve; a bore through which the fuel passes; a float bowl, contained within the walls of the device surrounding the bore; an obstruction located inside the bore of the dispensing device; a seal to prevent the flow of air around the outside of the fuel nozzle pump. The additive tank is connected to the dispenser by a conduit. Gravity causes the additive to flow from the tank, through the conduit into the dispensing device. The main shutoff valve is activated as a device cap is installed and deactivated as the cap is removed. The obstruction causes the additive to be drawn into the flow of fuel within dispensing device.

A system for dispensing an additive into a fuel. The system includes: a tank for holding a fuel additive and a dispenser. The dispenser includes: a main shutoff valve; a bore through which the fuel passes; a float bowl, contained within the walls of the device surrounding the bore; an obstruction located inside the bore of the dispensing device; a seal to prevent the flow of air around the outside of the fuel nozzle pump. The additive tank is connected to the dispenser by a conduit. Gravity causes the additive to flow from the tank, through the conduit into the dispensing device. The main shutoff valve is activated as a device cap is installed and deactivated as the cap is removed. The obstruction causes the additive to be drawn into the flow of fuel within dispensing device. The amount of fuel drawn into the dispensing device is determined by the draw created by the obstruction. The obstruction is designed to draw a predetermined amount of fuel additive into the dispensing device.

Further aspects and embodiments are provided in the foregoing drawings, detailed description, and claims.

BRIEF DESCRIPTION OF THE DRAWINGS

The drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular invention is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly indicates otherwise. For example, reference to "a substituent" encompasses a single substituent as well as two or more substituents, and the like.

As used herein, "for example," "for instance." "such as," or "including" are meant to introduce examples that further clarify more general subject matter. Unless otherwise expressly indicated, such examples are provided only to aid in understanding embodiments illustrated in the present disclosure and are not meant to be limiting in any fashion. Nor do these phrases indicate any kind of preference for the disclosed embodiment.

This invention can, with slight modification, be applied to different application in which a first liquid is to be mixed in smaller portions with a second liquid. In this embodiment, fuel additive is introduced to various types of fuels being introduced to a tank. This embodiment of the invention consists of at least 2 parts. 1) A reservoir/container containing fuel additive located outside the dispensing device. The bottom of said reservoir must be located above the top of the dispensing device to allow gravity to feed additive to the float bowl located inside the dispensing device. Said reservoir has a conduit, which connects the reservoir/container to the dispensing device. 2) The dispensing device itself performing four main functions. First, a main shutoff valve is actuated as the device cap is installed and removed. Said main shutoff valve, biased in the open position, opens and closes the passageway that extends from the conduit attachment on the outside of the dispensing device to the float valve opening at the top of the float bowl located inside the dispensing device. Second, a float bowl contained within the dispensing device which acts as a small reservoir that holds fuel additive and supports a float that actuates a float valve, closing the bowl to additive as the fluid level rises in the bowl. This prevents the free flow of fuel additive due to gravity from the reservoir to the fuel stream within the dispensing device anytime the cap is removed. Third, an actuator located inside the dispensing device on the wall of the bore of the dispensing unit. As fuel is dispensed from the fuel pump nozzle, through the device bore, a small obstacle acting as an actuator on the side of the dispensing device bore creates turbulence in the fuel flow, (commonly referred to as an eddy) and thus creates a low pressure which draws additive from the float bowl through a passageway into the dispensing device bore and thus into the fuel. Fourth, a rubberized boot, located in the neck of the fuel dispensing device, which receives the end of the fuel pump nozzle and creates a soft seal around the outside diameter of the fuel pump nozzle preventing the flow of air around the outside diameter of the fuel pump nozzle that would typically be drawn as a result of fuel flow out of the nozzle.

Flow rate of the additive into the bore of the dispensing device is dependent upon the low pressure created by the actuator located on the inside of the fuel device bore that creates a disturbance in the typical laminar flow of the fuel through the bore of the dispensing device. Said disturbance in the laminar flow, often referred to as drag, creates a low pressure that creates a draw on the fuel additive located inside the float bowl. The flow rate of the fuel through the dispensing device bore has a direct effect on the low pressure created by the actuator inside the fuel device bore. Faster fuel flow creates greater pressure drops and thus greater fuel additive draw from the float bowl. The actual flow rate of the fuel additive drawn from the dispensing unit float bowl can further be controlled by either changing the size of the orifice in the actuator, by changing the size and shape of the actuator itself or by the use of a mechanical metering device in the passageway between the float bowl and the actuator. The float bowl and float negate the effects of gravity on the flow of the additive into the fuel stream inside the bore allowing proper and accurate metering of fuel additive into the fuel stream.

It is the object of this invention to provide a fuel additive dispensing device for any system in which fuel additive is to be automatically and accurately introduced into a tank during fueling. Said invention will be driven by a fuel stream being discharged from a supply hose/discharge nozzle typically found at commercial fueling stations. As a result, fuel additive will be injected into the fuel stream proportional to the flow of the stream from the fuel pump nozzle. Faster fuel stream flow through the bore from the fuel pump nozzle will create greater draw and greater fuel additive flow while slower fuel stream flow through the bore will create lesser fuel additive flow.

Additionally, it is the object of this invention to include within the dispensing device a main shutoff valve operated by installing and removing a cap that replaces the function of the fuel tank cap of the vehicle. Said main shutoff valve is designed to be biased in the open position so that when the fuel device cap is removed, said main valve automatically opens and when the fuel device cap is installed, the main valve is closed, preventing the flow of fuel additive into the device's float bowl.

A further object of this invention is to design within the dispensing device system a float bowl including float and float valve which will neutralize the effect of gravity flow on the fuel additive before it is dispersed into the fuel stream thus preventing uncontrolled fuel additive flow into the fuel tank and allowing for accurate and predictable metering of the fuel additive.

Additionally, it is object of this invention to provide a method to create a soft seal inside the bore of the dispensing device in which the fuel nozzle is inserted. Said soft seal will be created using a rubberized boot inside the bore which, when the fuel pump nozzle is inserted, will accept the fuel pump nozzle creating a soft seal around the outside diameter of the fuel pump nozzle and eliminate air flow around the outside diameter of the fuel pump nozzle. Elimination of that air flow is essential to maintaining a controlled and predictable low pressure at the actuator that is located inside the bore of the dispensing device at a point below the maximum fuel pump nozzle insertion point or seat.

Although the present embodiment of the invention may apply to over the road semi-trucks, the dispensing device system may be used in any type of scenario in which it is useful to automatically mix one fluid in smaller proportions with a second fluid as fluid is introduced into a tank.

Figure 1:
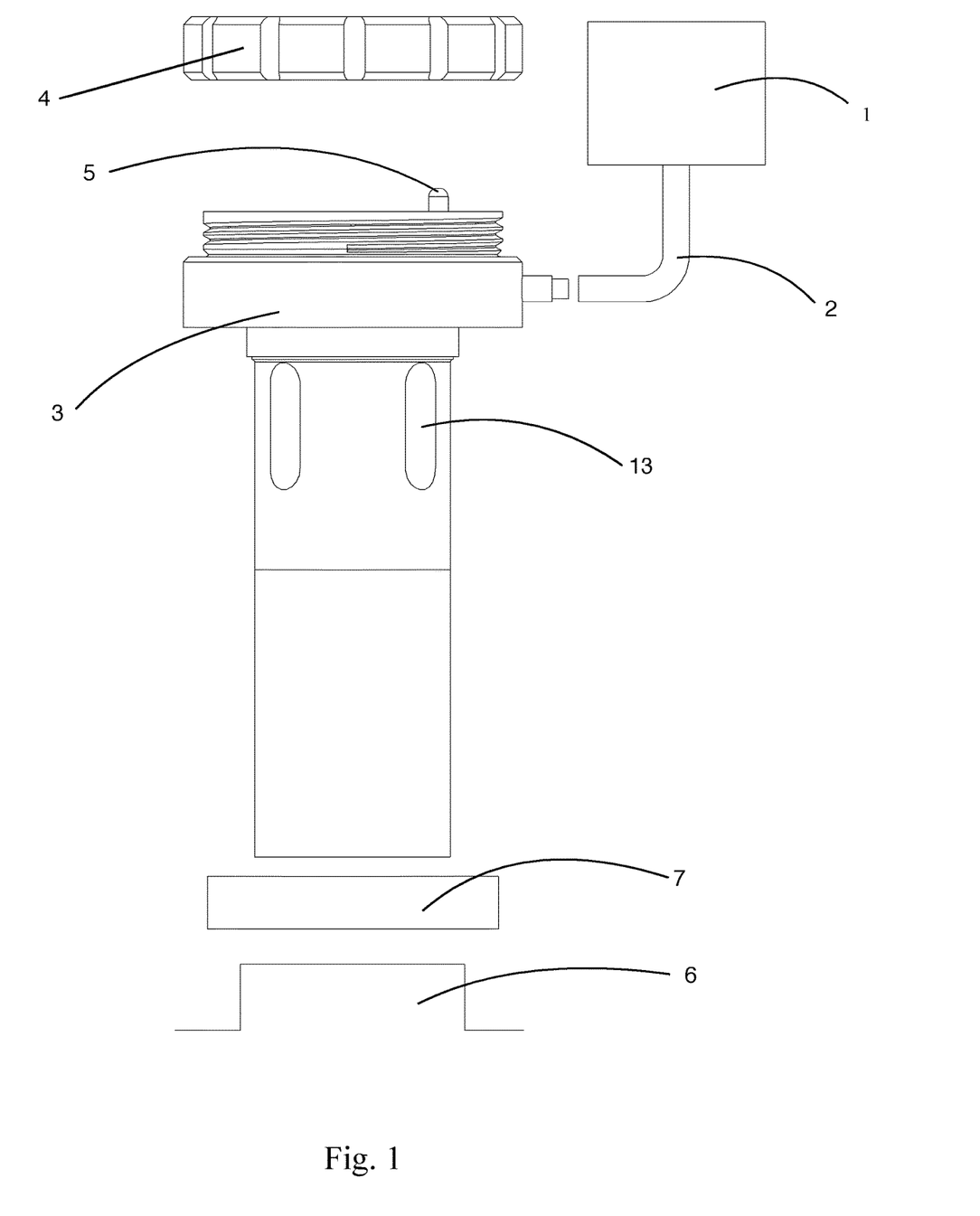
FIG. 1 shows a view of the components of the fuel additive delivery device as it may insert into the filler neck of a fuel tank.

FIG. 1. Shows a general view of the dispensing device and associated items. In some embodiments an additive reservoir 1 is attached to the cab or frame of the vehicle or apparatus being treated as determined most effective so that the lowest point of the reservoir is located above the highest point of the dispensing device. In some embodiments the additive reservoir is not attached to the vehicle. The conduit 2 connects the reservoir to the dispensing device. The dispensing device 3 is designed to fit inside the fuel tank 6 through the existing filler neck located near the top of the fuel tank through which fuel is typically added to the vehicle fuel tank. The dispensing device 3 attaches to the vehicle fuel tank, through the filler neck 6, of the vehicle fuel tank using an adapter 7 specifically designed for each brand of vehicle/truck thus providing an airtight seal. As a dispensing device 3 is installed on a vehicle/truck, the original fuel cap is removed and replaced with a dispensing device 3. The dispensing device 3 is equipped with its own cap 4, which performs the function of the original vehicle fuel tank's fuel cap. In addition, as the dispensing device cap 4 is installed and removed using traditional methodologies, it actuates a main shutoff valve 5 which is biased in the open position. When the dispensing device cap 4 is removed, the main shutoff valve is open and allows fuel additive flow from then reservoir to the dispensing device. When the dispensing device cap 4 is installed, it closes the main shutoff valve 5 preventing flow of fuel additive from reservoir 1, through conduit/tube 2 in to the dispensing device 3. Removing the dispensing device cap 4 allows the main shutoff valve to move to its biased open position allowing flow of fuel additive from the reservoir 1, through conduit 2, past the open main valve 5 into the float bowl located inside the dispensing device.

It is important to note in FIG. 1, openings 13 that allow air to vent out through the top of the dispensing devices bore from the fuel tank as fuel is added through the dispensing device effectively equalizing any pressure change created by introducing fuel into the vehicle fuel tank.

Figure 2:
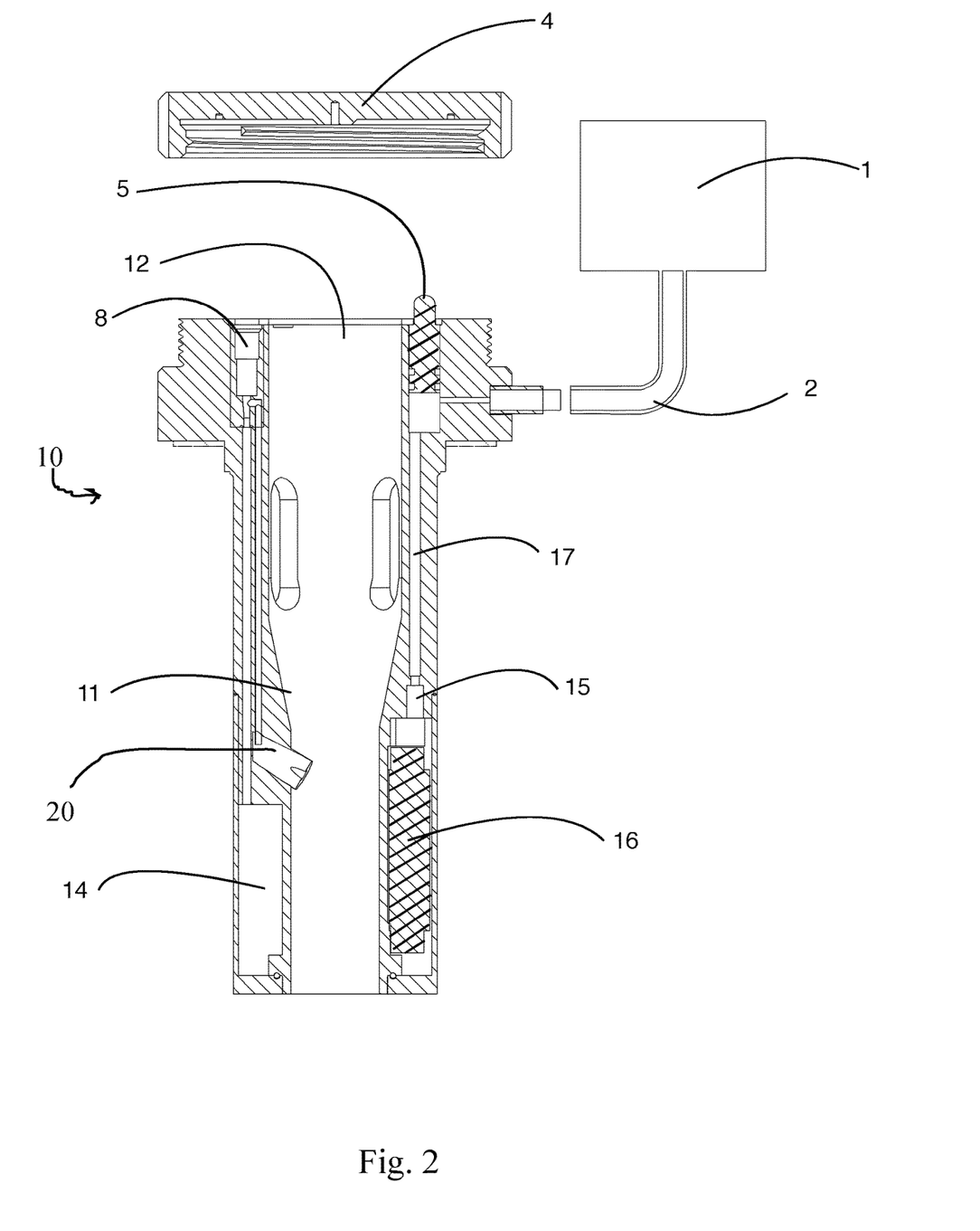
FIG. 2 shows a cross section of the dispensing device itself exposing the majority of internal components.

FIG. 2 shows a cross section of a dispensing device 3 with the dispensing device cap 4 removed. The dispensing device bore 12 extends from the top of the dispensing device, at which point the fuel pump nozzle is inserted, to the bottom of the dispensing device 10, located inside the fuel tank, where the fuel enters the fuel tank. There exists a rubberized boot in which the fuel pump nozzle rests upon insertion through the top of bore opening 12. Said rubberized boot creates a soft seal with the fuel nozzle preventing air from passing between the outside diameter of the fuel nozzle and the bore opening. The top portion of the bore from the top opening 12, down to the rubberized boot, where the fuel pump nozzle rests, is designed to accept a typical fuel pump nozzle as well as accommodate displaced air passing through openings 13 (see FIG. 1) from the fuel tank cause by the addition of fuel through the bottom of the dispensing device bore 12 into the tank. Likewise it is important that the dispensing device bore from the fuel pump nozzle cone 11 to the bore opening at the bottom of the dispensing device 10 has no constriction so as to allow free flow of fuel from the fuel pump nozzle through bore opening 12. Specifically, the dispensing device bore from the bottom of the fuel pump nozzle cone 11 to the bore opening at the bottom of the dispensing device 10 should be of the same or larger diameter as the inside of the fuel pump nozzle diameter.

Continuing with FIG. 2, when the dispensing device cap 4 is removed, main valve 5 will bias to the open position and gravity will allow fuel additive to flow from the fuel additive reservoir 1 through the conduit 2 past the main shutoff valve 5 down the passageway 17 that leads to the float bowl 14. There is a float valve 15, and a float 16. As the float bowl 14 fills with fuel additive from the reservoir 1, the rising float 16 actuates the float valve 15 to close the passageway 17 preventing flow of fuel additive into the bowl 14.

As fuel passes through the bore in the device, the fuel flows over and around an obstruction 20, the obstruction creates an eddy in the flow of fuel. The eddy behind the obstruction decreases the pressure in the bore of the device. This decrease in pressure causes additive to be drawn through the delivery passageway 19, around the obstruction 20, and into the bore, the fuel additive level in the bowl 14 will lower. As a result, the float 16 will descend accordingly reducing pressure on the float valve 15 allowing passage of fuel additive from the reservoir 1, through the conduit 2, past the main valve 5, through passage 17, and into the bowl 14 whenever the main shutoff valve 5 is in the open position.

It is important to note that the obstruction 20 is attached to the side of the bore below the nozzle insertion cone 11, in a location where it creates an eddy and decreases the pressure in the bore so that the additive is drawn into the bore. It can be of various shapes or sizes as deemed appropriate to create the most productive results. For example, in the preferred embodiment, the obstruction is oblong. In an alternative embodiment the obstruction is a cube. Other alternative embodiments include shapes such as cones, cones, cylinders, pyramids, or spheres. In yet another embodiment the obstruction is connected to an actuator. The actuator moves the obstruction further into or out of the bore of the device. By moving the obstruction further into the bore of the device the obstruction is moved further into the flow of the fuel through the device. Moving the obstruction further into the flow of the fuel changes the eddy behind the obstruction. A move further into the bore increases the size of the obstruction. Increasing the size of the obstruction increases the strength of the eddy, which causes a decrease in pressure. The decrease in pressure increases the amount of fuel additive flowing into the device. Moving the obstruction out of the bore, decreases the size of the obstruction and decreases the eddy behind the obstruction. The decrease of the eddy decreases the pressure in the bore and decreases the amount of additive pulled into the device and delivered into the fuel tank. The amount of the additive added to the fuel tank can be changed based on the pressure in the bore caused by the eddy. There are multiple additives that can be added to the fuel tank, each additive is added according to its own proportion to the fuel. Each fuel additive will require its own obstruction to draw the proper amount of additive into the fuel tank. Alternatively, in embodiments that utilize an actuator attached to the obstruction, the actuator will move the obstruction into the proper place to draw the proper amount of additive into the fuel tank. Each additive will have a specified position of the obstruction attached to the actuator.

Upon removal of the fuel pump nozzle, the cap 4 is replaced on the dispensing device, closing the main valve 5, disallowing any flow of fuel additive from the reservoir 1 through passageway 19 into the float bowl 4.

Figure 3:
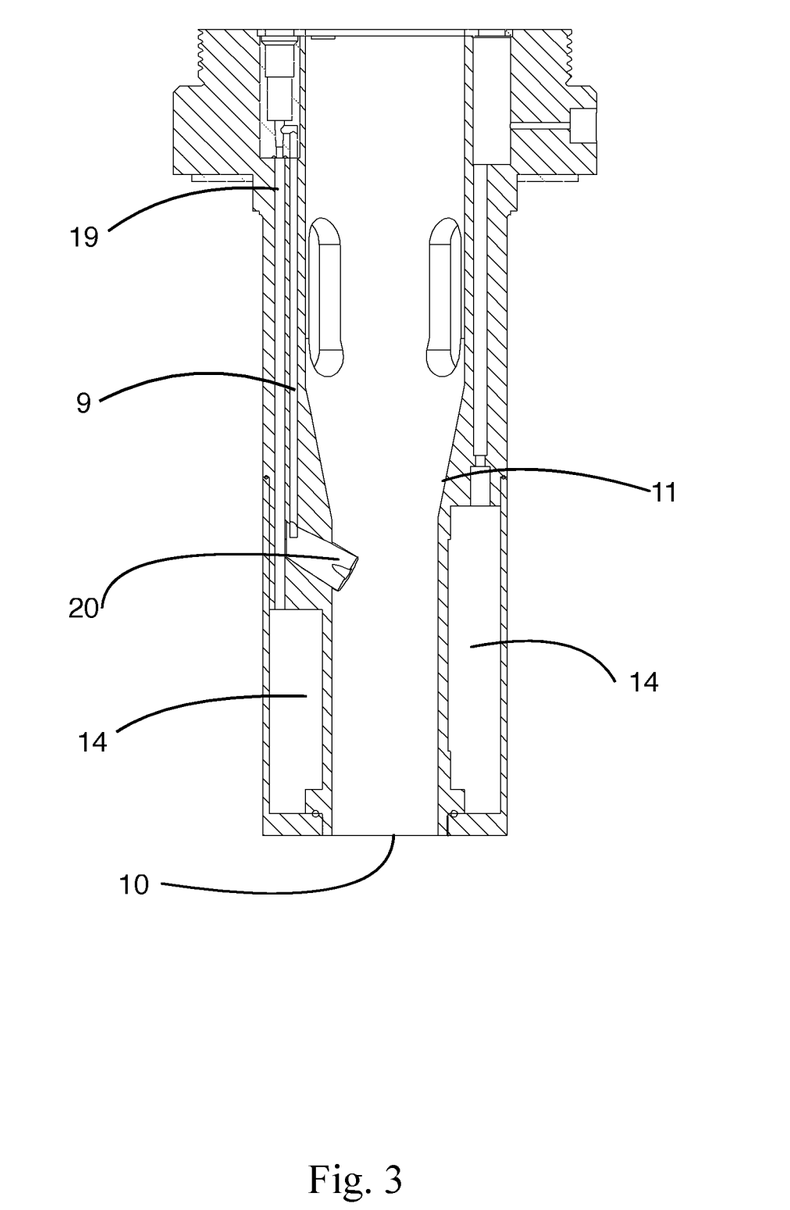
FIG. 3 illustrates a more detailed view of the components of the float bowl and its interaction with the actuator

FIG. 3 follows the flow of fuel additive from the float bowl 14 to the actuator 20. As the fuel pump nozzle is inserted into the dispensing device bore 12, at the top of the dispensing device, and fuel is discharged from the fuel pump nozzle, it passes through the bore of the dispensing device 12, past the actuator 20, out the bottom of the bore opening 10. The actuator 20 creates turbulence in the fuel flow creating drag which creates a low pressure which draws fuel additive from the float bowl 14. The fuel additive travels from the float bowl 14, up passageway 19 through a metering device, through the actuator 20, into the fuel stream flowing through the bore below cone 11 into the fuel tank located below the bottom of the dispensing device bore 10. This reduces the level of fuel additive in the float bowl 14 causing the float located inside the float bowl 14 to drop, opening the float valve 15.

Figure 4:
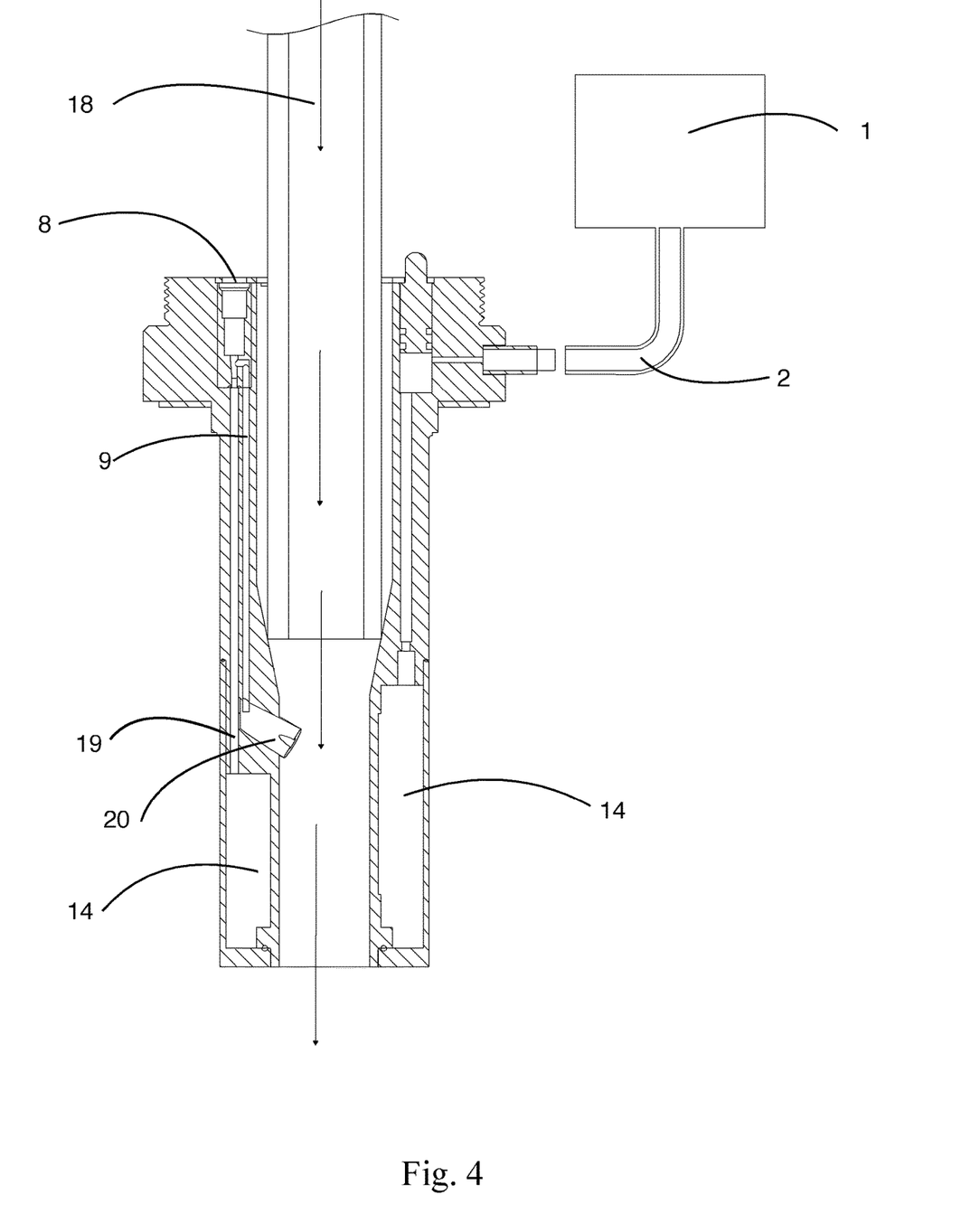
FIG. 4 illustrates a larger picture of fluid flow through the apparatus from the fuel additive supply reservoir to the float bowl and then into the fuel flow inside the dispensing device bore.

FIG. 4 shows all parts of the dispensing apparatus from FIGS. 1, 2, and 3 in use. Fuel additive flows from the fuel additive reservoir 1 to the float bowl 14 when the dispensing device cap is removed allowing the main shutoff valve 5 to move to its biased open position. FIG. 4 continues to follow the flow of fuel additive from float bowl 14 into the main bore of the dispensing device.

As the action described in paragraph 22 occurs, the float valve 15 opens, and fuel is allowed to pass from the fuel additive reservoir 1, through the conduit 2, past the open main shutoff valve 5, through the passageway 17 into the float bowl 14. As the fuel additive level in the float bowl 14 rises, the float inside the float bowl 14 rises closing the float valve 15 stopping fuel additive flow into the float bowl 14 from the fuel additive reservoir 1. This process continues as needed whenever the dispensing device cap is removed allowing the main shutoff valve 5 to be in the open position and fuel additive is drawn from the float bowl 14 through passageway 19 out actuator 20 into the fuel stream 18 inside the dispensing device bore.

Figure 5:
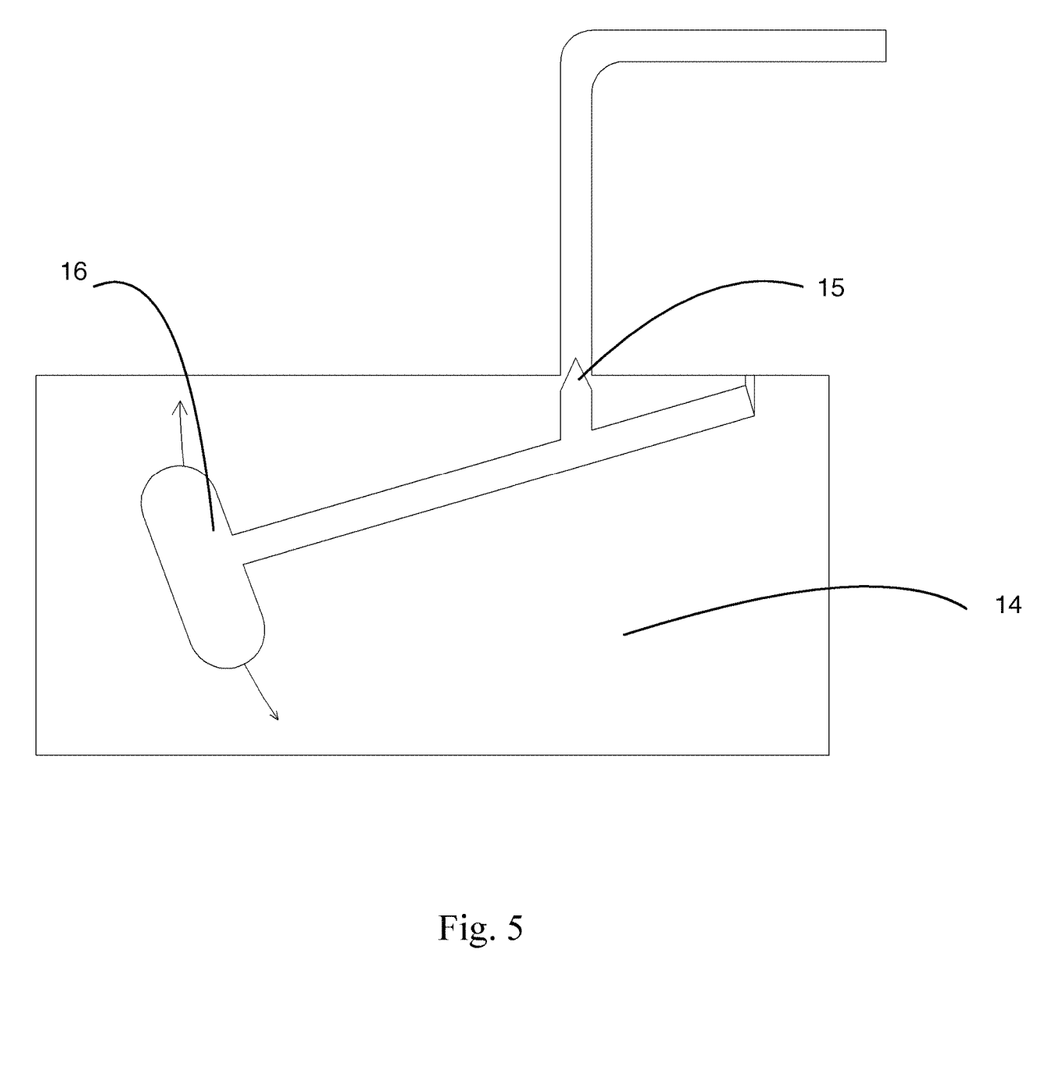
FIG. 5 illustrates a typical float bowl which opens a valve as fluid in the float bowl lowers and closes a valve as fluid in a float bowl rises.

FIG. 5 shows the action of a typical float bowl 14, as well as a typical float 16, and float bowl valve 15 located inside a float bowl 14. FIG. 5 illustrates how as the fluid level in a float bowl 14 raises and lowers, the float 16 raises and lowers with the fluid level thus closing and opening the float valve 15.

Figure 6:
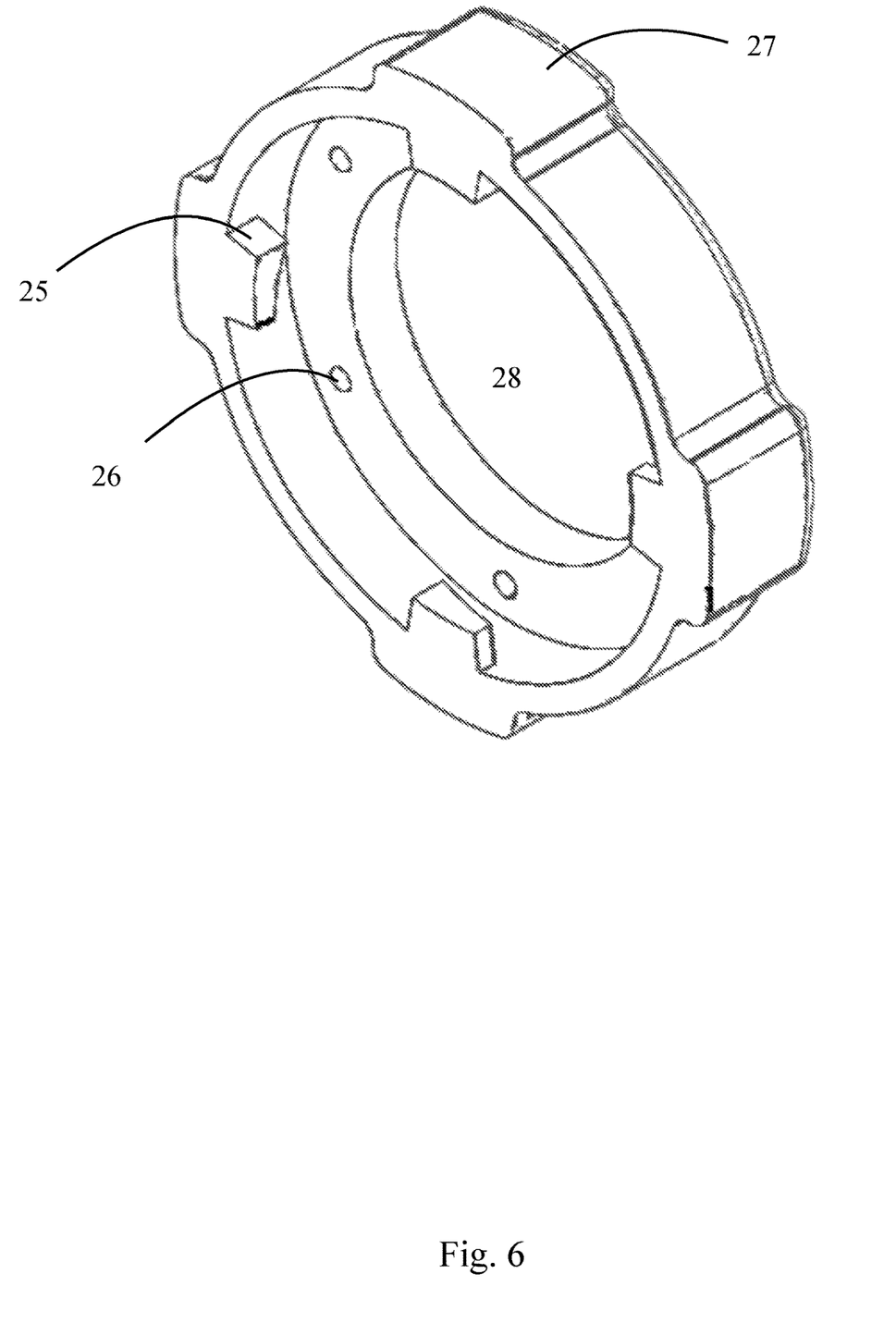
FIG. 6 is a perspective view of an adapter for securing the dispenser to a fuel tank.

There are many companies that manufacture automobiles and big rig trucks. Most of these companies have designed their own fuel tanks and fuel caps to fit on those fuel tanks. Because each company has its own fuel tank and fuel tank cover it is necessary to design an adapter for each company so that the dispensing device will attach to that company's fuel tank. The dispensing device attaches to the vehicle fuel tank, through the filler neck, of the vehicle fuel tank using an adapter specifically designed for each brand of vehicle/truck thus providing an airtight seal. A representative adapter is described in FIG. 6. The adapter ring 27 has a hole 28 through which the dispensing device fits. In some embodiments the adapter ring 27 is secured to the fuel tank with fasteners such as screws or rivets which pass through holes such as fastener hole 26. The dispensing device is secured in place to the adapter ring with the aid of securing fobs such as securing fob 25. This adapter is representative of the adapters used for each brand of big rig.

All patents and published patent applications referred to herein are incorporated herein by reference. However, any reference to prior publication is not, and should not be taken as an acknowledgement, admission, or suggestion that the prior publication, or any information derived from it is part of the general common knowledge in the field of endeavor to which this specification relates. The invention has been described with reference to various specific and preferred embodiments and techniques. Nevertheless, it is understood that many variations and modifications may be made while remaining within the spirit and scope of the invention.

What is claimed is:

1. A system, comprising:
   a tank for holding a fuel additive;
   a conduit coupled to the tank;
   a dispenser coupled to the conduit, the dispenser being configured to be at least partially disposed within a filler neck of a fuel tank of a vehicle, the dispenser including:
   a body;
   a bore through the body, the bore being configured to receive at least a portion of a fuel pump nozzle to allow fuel to flow from the fuel pump nozzle through the bore and the filler neck and into the fuel tank;
   a float bowl formed within the body, the float bowl surrounding the bore and being in fluid communication with the conduit, wherein the body includes a passageway configured to put the float bowl in fluid communication with the bore;
   an obstruction disposed on a first side of an inner surface of the bore, wherein the obstruction is configured to cause an eddy current in the fuel as the fuel flows through the bore, wherein the eddy current causes fuel additive to be drawn out of the float bowl through the passageway and into the bore;
   a main shutoff valve coupled to the dispenser, wherein the main shutoff valve is configured to selectively inhibit a flow of the fuel additive from the tank into the float bowl;
   a device cap configured to removably couple to a first end of the body of the dispenser, wherein, when the device cap is coupled to the first end of the body, the main shutoff valve is configured to inhibit the flow of the fuel additive and when the device cap is not coupled to the first end of the body, the main shutoff valve is configured to enable the flow of the fuel additive.

2. The system of claim 1, wherein the tank for holding the fuel additive is attached to a frame of a vehicle.

3. The system of claim 1, wherein the main shutoff valve is biased in an the open position.

4. The system of claim 2, wherein when the device cap is removed the main shutoff valve automatically opens.

5. The system of claim 1, wherein the obstruction is movable within the bore of the device.

6. The system of claim 5, wherein moving the obstruction within the bore increases or decreases an amount of fuel additive drawn into the bore.

7. A system, comprising:
   a dispenser adapted to attach to a filler neck of a fuel tank of a vehicle, the dispenser comprising:
   a main shutoff valve;
   a bore configured to allow fuel to pass through the dispenser;
   a float bowl contained within walls of the dispenser surrounding the bore, the float bowl configured to be placed in fluid communication with a tank configured to hold a fuel additive;
   an obstruction located inside the bore of the dispenser at a side of the bore;
   wherein the additive tank is configured to be connected to the dispenser by a conduit;
   wherein the main shutoff valve is activated as a device cap is installed and deactivated as the cap is removed;
   wherein the obstruction causes the fuel additive to be drawn into a flow of fuel within the dispenser;

wherein an amount of the fuel additive drawn into the dispensing device is determined by an eddy current in the flow of fuel created by the obstruction;

wherein the obstruction is designed to cause a predetermined amount of fuel additive to be drawn into the dispensing device.

8. The system of claim 7, wherein the tank for holding the fuel additive is attached to a frame of a vehicle.

9. The system of claim 7, wherein the main shutoff valve is biased in an open position.

10. The system of claim 9, wherein when the device cap is removed the main shutoff valve automatically opens.

11. The system of claim 7, wherein the obstruction is movable within the bore of the device.

12. The system of claim 11, wherein moving the obstruction within the bore increases or decreases the amount of fuel additive drawn into the bore.

* * * * *